(12) United States Patent
Saldhana

(10) Patent No.: US 8,799,439 B2
(45) Date of Patent: Aug. 5, 2014

(54) MANAGING ATTRIBUTES ASSOCIATED WITH AN APPLICATION SERVER

(75) Inventor: Anil Saldhana, Oak Park, IL (US)

(73) Assignee: Red Hat, Inc., Raleigh, NC (US)

( * ) Notice: Subject to any disclaimer, the term of this patent is extended or adjusted under 35 U.S.C. 154(b) by 31 days.

(21) Appl. No.: 13/211,598

(22) Filed: Aug. 17, 2011

(65) Prior Publication Data

US 2013/0046870 A1 Feb. 21, 2013

(51) Int. Cl.
*G06F 15/173* (2006.01)

(52) U.S. Cl.
USPC .............. 709/223; 709/203; 726/3; 705/67

(58) Field of Classification Search
USPC .............. 709/203, 223, 219; 726/3; 705/67
See application file for complete search history.

(56) References Cited

U.S. PATENT DOCUMENTS

| | | | |
|---|---|---|---|
| 7,904,448 B2 * | 3/2011 | Chung et al. | 707/721 |
| 2003/0187978 A1 * | 10/2003 | Nakamura et al. | 709/224 |
| 2008/0114770 A1 * | 5/2008 | Chen et al. | 707/10 |
| 2010/0205451 A1 * | 8/2010 | Cannon et al. | 713/185 |
| 2012/0017259 A1 * | 1/2012 | MacCarthaigh | 726/1 |
| 2012/0260322 A1 * | 10/2012 | Logan et al. | 726/6 |

\* cited by examiner

*Primary Examiner* — El Hadji Sall
(74) *Attorney, Agent, or Firm* — Lowenstein Sandler LLP

(57) ABSTRACT

Embodiments relate to systems and methods for maintaining attributes associated with application servers. In particular, a system administrator can register a set of services associated with an application server. Before initiating, a service can need to be configured with a set of attributes. According to embodiments, a vault service associated with the application can validate a service requesting to be configured. Further, an attribute management tool can store attributes, such as passwords and other sensitive data, associated with the requesting service. Upon a successful validation, the attribute management tool can provide the associated attributes to the vault service, which uses the attributes to configure the service.

20 Claims, 4 Drawing Sheets

MANAGING ATTRIBUTES ASSOCIATED WITH AN APPLICATION SERVER

FIELD

The invention relates generally to systems and methods for configuring application servers, and more particularly, to platforms and techniques for managing attributes associated with application servers.

BACKGROUND

Application servers are entities in system and network environments in which various applications or services can execute or operate. In particular, application servers are dedicated to the efficient execution of processes, procedures, routines, scripts, and software code for supporting the functionalities of applications and services. Software developers can access application servers via various application programming interfaces (APIs).

The Java Platform, Enterprise Edition, Java EE, or J2EE are widely used platforms for server programming in the Java programming language. A J2EE container is a runtime entity that provides services to specialized Java components. Services provided by a container typically include life cycle management, security, deployment, and component-specific services. Containers are used in a wide variety of Java components, such as Enterprise Javabeans (EJB), Web pages, Java Server Pages (JSP), servlets, applets, and application clients.

During operation of a Java EE application server, various services or applications associated with the services may need to be configured by a system administrator or other entity. The configuration can include attributes or properties that, themselves, need to be configured by the system administrator. However, some of the attributes or properties can be sensitive in nature and may need to be securely protected. Therefore, it may be desirable to provide systems and methods for securing attributes. In particular, it may be desirable to provide systems and methods for managing access to attributes associated with the operation of an application server.

DESCRIPTION

Embodiments of the present teachings relate to systems and methods for configuring services of application servers in a network. In particular, embodiments relate to platforms and techniques for establishing a vault or database to secure and/or manage attributes associated with application servers. An attribute management tool or similar logic or resources can be configured to connect to a set of application servers. In embodiments, the set of application servers can each be configured with a set of services and a set of applications.

Further, each of the set of application servers can be configured with a vault service than can run or execute in each of the set of application servers. The vault service can interface with or otherwise connect to the attribute management tool. In particular, other services of the application servers can request attributes via the vault service. The vault service can connect to the attribute management tool, which can retrieve the applicable attribute(s) and provide the attribute(s) to the vault service, which can provide the attribute(s) to the requesting service.

Figure 1:
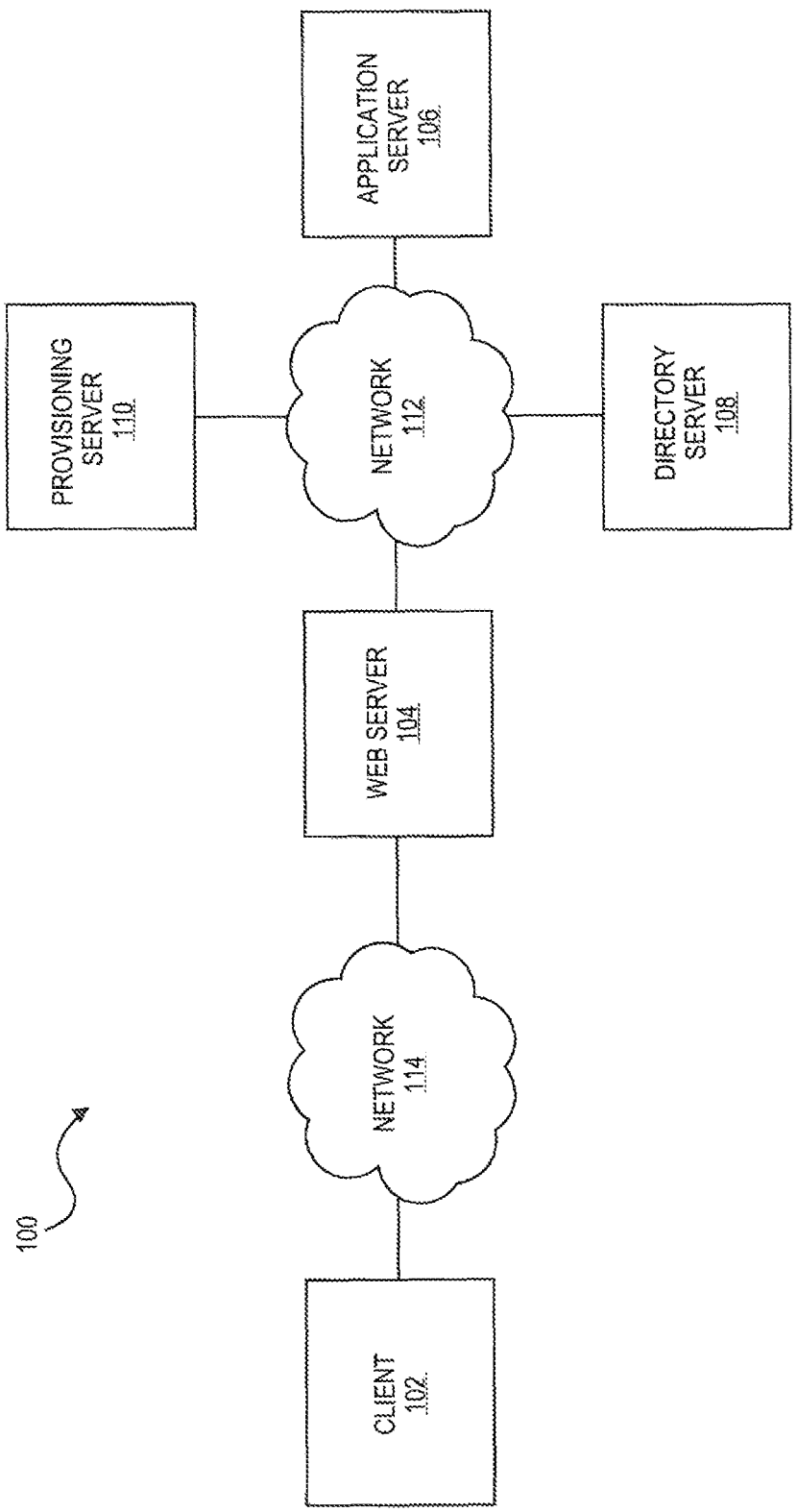
FIG. 1 illustrates an overall system architecture in which various aspects of systems and methods for application server functionality can be practiced, according to embodiments.

Referring to FIG. 1, illustrated is an exemplary environment 100 in which the present systems and methods may be implemented. As shown in FIG. 1, the environment 100 can comprise a client 102, a web server 104, an application server 106, a directory server 108, and a provisioning server 110. These components can be coupled together via networks 112 and 114, respectively, or other networks. It should be appreciated that other configurations and inclusions of other components are envisioned in accordance with the present systems and methods.

In embodiments, the client 102 can be any computer system that utilizes the services of another computer system, i.e., the web server 104 and the application server 106. As shown in FIG. 1, the client 102 can be implemented using components well known to those skilled in the art, such as a personal computer, laptop computer, personal digital assistant, mobile phone, tablet device, and the like. In the embodiments as shown in FIG. 1, the client 102 can be used to run Web applications via an application, such as a web browser.

In embodiments, the web server 104 can be a computer system configured to accept requests from clients, such as the client 102, and serve responses along with optional data contents. For example, a user of the client 102 can execute a Web application via the web server 104. In the embodiment as shown, the data content served by the web server 104 can be one or more Web pages that can include hypertext markup language (HTML) documents and linked objects such as, for example, images, video, audio, and the like.

The web server 104 can be implemented on a machine that comprises well known hardware and software. Well known software for the web server 104 can include, but is not limited to, software such as Apache HTTP Server from the Apache Software Foundation, Internet Information Services by Microsoft Corporation®, and Sun Java System Web Server from Sun Microsystems Inc®. One skilled in the art will recognize that any of the many different Web server programs available are consistent with the principles of the present invention.

The application server 106 can be software that provides applications to the client 102. In particular, the application server 106 can be configured to handle security, business logic, and data access for the applications provided to the client 102. In embodiments, the application server 106 can be configured to provide a variety of Web-based applications, such as e-commerce applications, content management applications, customer relations management applications, and the like.

The application server 106 can be implemented on various software platforms. For example, the application server 106 can be implemented on the well known J2EE platform from Sun Microsystems Inc®. In addition, the application server 106 can comprise middleware configured to enable applications to intercommunicate with dependent applications, such as the web server 104, database management systems, etc.

In further embodiments, the application server 106 can be implemented using well known software. For example, the application server 106 can be implemented using software, such WebLogic server from BEA Systems Inc.®, JBoss from Red Hat Inc.®, Websphere from the IBM Corporation®, and the like. Accordingly, the application server 106 can implement the Java programming language and provide Web modules using servlets and JavaServer pages. Other functions of the application server 106 can also employ Java. For example, business logic provided by the application server 106 can be built into Enterprise JavaBeans (EJBs). J2EE can provide standards for containing the Web components. In addition, security services, such as authentication and authorization, can be implemented using the Java Authentication and Authorization Service (JAAS) or similar service.

The directory server 108 can represent the components that store and organize information about the users of the system 100 and an administrator of the system 100 to manage those users' access to the resources of the system 100. In embodiments, the directory server 108 can comprise a database (not shown) that can store information about named objects that are managed. The directory server 108 can also provide the access interface to the data that is contained in this database. The directory server 108 can be implemented using well known technologies. For example, the directory server 108 can be implemented as an X.509 directory service or Lightweight Directory Access Protocol (LDAP) service. In embodiments, the directory server 108 can be implemented as services from various vendors such as, for example, Red Hat Directory Server from Red Hat Inc.®; Active Directory by the Microsoft Corporation®; Apache Directory Server by the Apache Software Foundation; and Sun Java System Directory Server by Sun Microsystems Inc®.

In embodiments, the provisioning server 110 can be software, hardware, or a combination thereof that can be configured to listen for provisioning requests in the system 100 and return provisioning responses. In some embodiments, the provisioning server 110 can be configured as a service provisioning markup language (SPML) provisioning service provider. The provisioning server 110 can be implemented as a separate software component of the system 100 or can be integrated with other components of the system 100. For example, the provisioning server 110 can be a component that is installed as part of the directory server 108.

In embodiments, the network 114 can represent the communications infrastructure for allowing the client 102 and the web server 104 to communicate with each other. For example, the network 114 can represent the Internet, which is a worldwide, publicly accessible network that uses the Internet Protocol (IP) suite of standards. In embodiments, the network 112 can represent the communications infrastructure that allows the web server 104, the application server 106, the directory server 108, and the provisioning server 110 to communicate with each other. In embodiments, the network 112 can be implemented as a local area network or may utilize one or more larger networks, such as the Internet.

Figure 2:
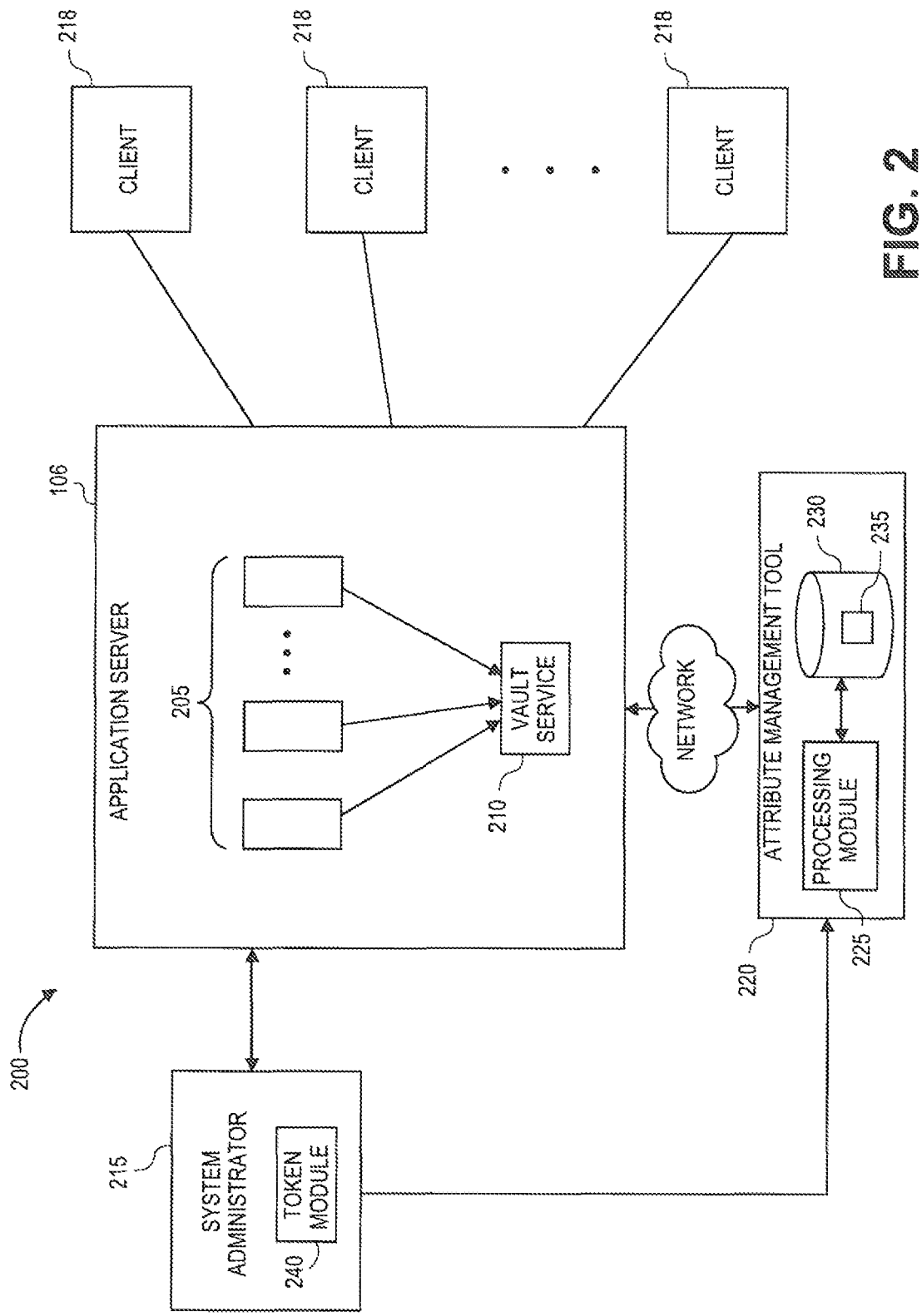
FIG. 2 illustrates an exemplary configuration of components in which various aspects of systems and methods for managing access to attributes can be practiced, according to embodiments.

FIG. 2 is an exemplary illustration of an application server environment 200. It should be appreciated that the environment 200 as illustrated in FIG. 2 is merely exemplary and can comprise other elements, steps, processing ordering, and the like.

As shown in FIG. 2, the environment 200 can comprise an application server 106, such as the application server 106 as described in reference to FIG. 1. In embodiments, the application server 106 can be a JBoss application server, or other types of application servers. Further, as shown in FIG. 2, the application server 106 can comprise a set of services 205. For example, the services can be Enterprise JavaBean (EJB) container services, web container services, security services, web application services, Java Connector Architecture (JCA) services, and other services. In embodiments, each of the set of services 205 can comprise and/or execute a set of applications. Further, in embodiments, the set of applications can be those that the set of services 205 can serve to a client. In particular, the set of services 205 in conjunction with the set of applications can be configured to handle security, business logic, and data access for one or more clients or customers. In embodiments, the set of applications can be Web-based applications, such as e-commerce applications, content management applications, customer relations management applications, and the like.

As shown in FIG. 2, the environment 200 can comprise a set of clients 218. In embodiments, the set of clients 218 can be configured to connect to the application server 106 via any type of network or data connection. Further, the set of clients 218 can be implemented using components well known to those skilled in the art, such as a personal computer, laptop computer, personal digital assistant, mobile phone, tablet device, and the like. Still further, the set of clients 218 be be accessed by any user, administrator, owner, or other individual or entity. According to embodiments, the application server 106 can be configured to serve the any of the set of services 205 and any corresponding applications to the set of clients 218. For example, the application server 106 can be configured to serve an email application to the set of clients 218.

As shown in FIG. 2, the application server 106 can be configured to interface with a system administrator 215. In embodiments, the system administrator 215 can be any user, owner, administrator, or other entity, or any combination of hardware and software that can be configured to perform the functions as discussed herein. Further, in embodiments, the system administrator 215 can be configured to connect to the application server 106 via any direct connection or any data communication network. According to embodiments, one or more of the set of services 205 may need to be configured in order to initiate and/or execute. In particular, the system administrator 215 can process, initiate, and/or otherwise configure attributes, properties, or other types of data in order to configure the set of services 205. In embodiments, the attributes can comprise passwords or other sensitive data that can be needed to configure the set of services 205.

The application server 106 can further comprise a vault service 210 that can be configured to interface with the set of services 205. According to embodiments, each of the set of services 205 can request configuration attributes or properties via the vault service 210. As shown in FIG. 2, the environment 200 can further comprise an attribute management tool 220 that can interface with the application server 106 via, for example, a network 222, as well as the system administrator 215. In embodiments, the network 222 can be any wired or wireless data network such as the Internet or other public, private, and secure networks. Although not shown in FIG. 2, the attribute management tool 220 can be configured to connect to and process configuration functions of multiple application servers.

As shown in FIG. 2, the attribute management tool 220 can comprise a processing module 225 and a database 230. The processing module 225 can be configured to perform or otherwise execute the functions of the attribute management tool 220, and the database 230 can be configured to store any attributes associated with the application server 106, the components thereof, and other resources. For example, if a web container service of the application server 106 needs to be configured, then the processing module 225 can facilitate the retrieval of any attributes associated with the configuration from the database 230. It should be appreciated that the processing module 225 and the database 230 can perform other functions in accordance with embodiments as described herein.

The database 230 can be configured to store a set of attributes 235, and other data. In embodiments, the attributes 235 can be any type of specification that can define a property of an element, object, file, or other type of data associated with the set of services 205 and/or the application server 106. In embodiments, the set of attributes 235 can refer to or set a specific value for a given instance of the set of services 205 and/or the application server 106. In further embodiments, the set of attributes 235 can be related to a configuration of any of the set of services 205. For example, in an operation of an email service, the attributes can be one or more of email address, usernames, passwords, settings, connection configurations, or any other related data.

In embodiments, the system administrator 215 can be configured to execute a token module 240 that, in embodiments, can be online or offline. In embodiments, the token module 240 can be provided by the attribute management tool 220, and can be a part of the system administrator 215 (as shown in FIG. 2), the attribute management tool 220, the application server 106, or other entities or components. The token module 240 can be configured to generate, access, or distribute shared tokens associated with each of the set of services 205. In embodiments, the token module 240 can be configured to register any of the set of services 205 with the application server 106. When a service is registered with the application server 106, the token module 240 can be configured to generate a shared token for the registered service. Further, the token module 240 can be configured to provide the shared token to the registered service, to the attribute management tool 220 for storage in the database 230, and/or to the vault service 210. Further, the token module 240 can be configured to retrieve existing shared tokens from any of the entities of the environment 200.

According to embodiments, the system administrator 215 can configure each of the set of services 205 using attributes associated with the attribute management tool 220. In embodiments, the attributes can be sensitive data such as passwords, or other attributes. Further, in embodiments, the set of services 205 can initiate a self-configuration. For the services that need access to the attributes of the attribute management tool 220, the services can be configured to provide their associated shared token to the vault service 210. In embodiments, the vault service 210 can be configured to validate the shared token of the service. For example, the vault service 210 can compare the shared token received from the service to an existing, stored token associated with the service. If the tokens match, then the vault service 210 can validate the shared token received from the service. In embodiments, if the vault service 210 does not validate the shared token, then the vault service 210 can be configured to provide a notification to the requesting service, the system administrator 215, and/or other entities. It should be appreciated that the notification can be provided to the entities as any type of communication via any type of data transport network or connection.

If the vault service 210 validates the shared token of the requesting service, then the vault service 210 can be configured to interface with the attribute management tool 220 to retrieve attributes necessary to configure the requesting service. In embodiments, the processing module 225 can receive a request from the vault service 210 to retrieve specific attributes from the set of attributes 235. For example, the processing module 225 can retrieve passwords necessary for the configuration of a security service. In other embodiments, the vault service 210 can be configured to provide the shared token to the processing module 225, which can validate the shared token and retrieve necessary attributes upon a successful validation.

In embodiments, the processing module 225 can be configured to provide the retrieved attributes to the vault service 210, the system administrator 215, and/or the requesting service. In embodiments, the vault service 210 can receive the attributes from the processing module 225, and provide the received attributes to the requesting service. Once the requesting service and/or entities receive the attributes, the attributes can be used to configure the requesting service. For example, the vault service 210 can use the received attributes to configure the requesting service.

Figure 3:
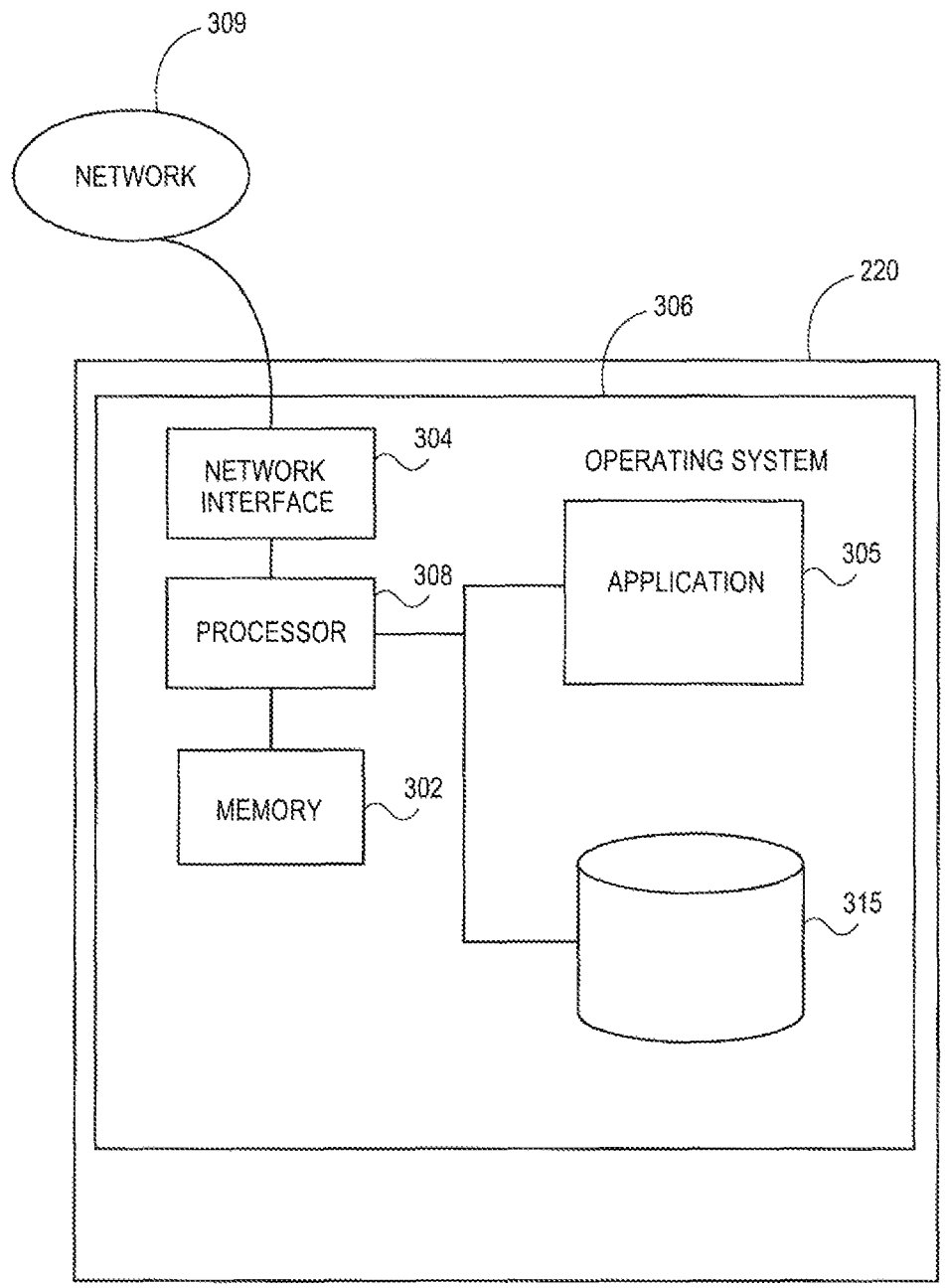
FIG. 3 illustrates an exemplary hardware configuration for an attribute management tool, according to various embodiments.

FIG. 3 illustrates an exemplary diagram of hardware and other resources that can be incorporated in the attribute management tool 220 configured to communicate with a set of application servers, and/or other entities, services, or resources via one or more networks 309 and/or other connections, according to aspects. Although FIG. 3 shows the components as part of the attribute management tool 220, the components can also be a part of the vault service 210 and other entities.

In embodiments as shown, the attribute management tool 220 can comprise a processor 308 communicating with memory 302, such as electronic random access memory, operating under control of or in conjunction with an operating system 306. The operating system 306 can be, for example, a distribution of the Linux™ operating system, the Unix™ operating system, or other open-source or proprietary operating system or platform. The processor 308 can also communicate with a database 315, such as a database stored on a local hard drive, and a set of applications 305, to execute control logic and control the operation of the resources as described herein. The processor 308 can further communicate with a network interface 304, such as an Ethernet or wireless data connection, which in turn communicates with the one or more networks 309, such as the Internet or other public or private networks. Other configurations of the attribute management tool 220, associated network connections, and other hardware, software, and service resources are possible.

Figure 4:
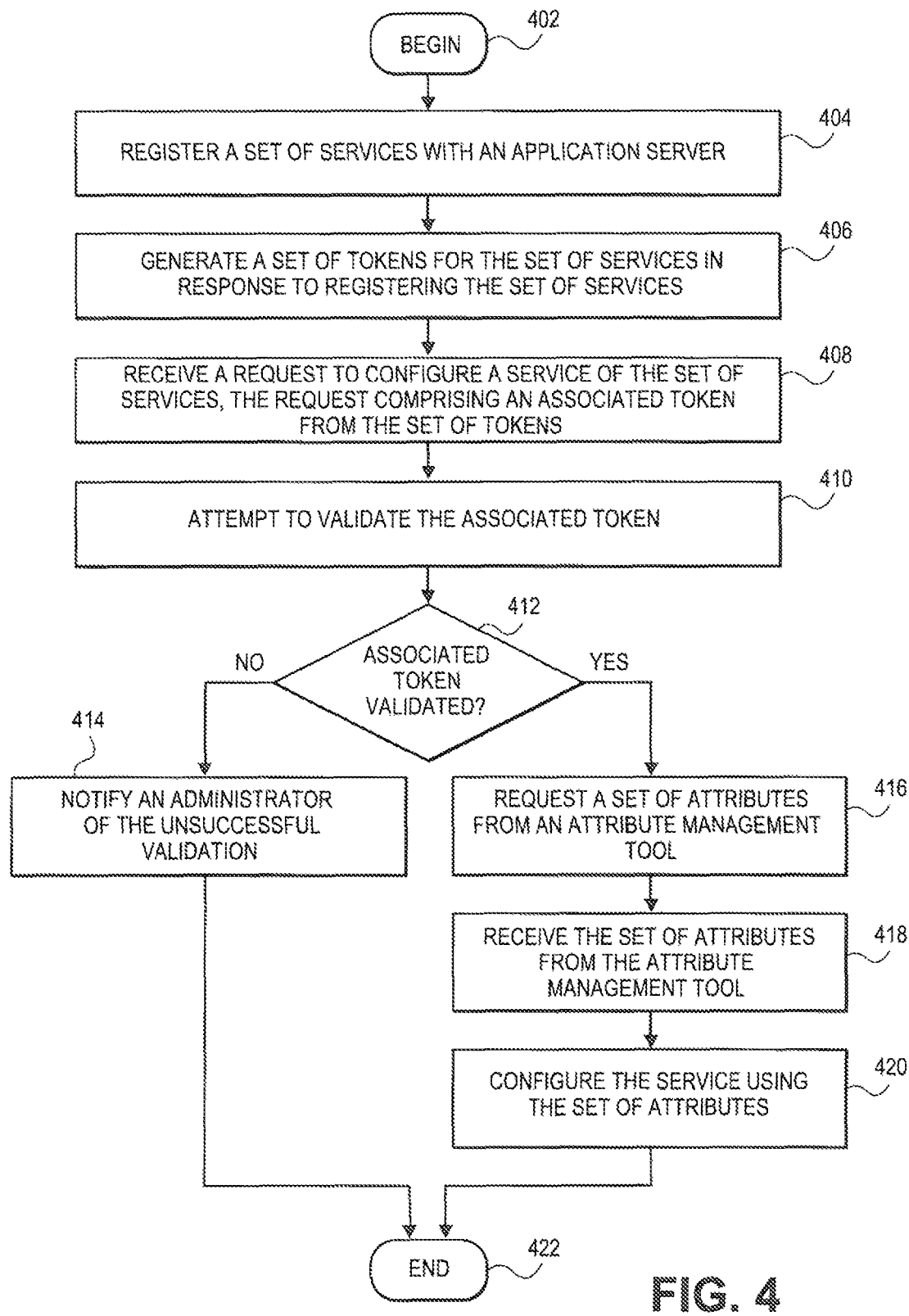
FIG. 4 illustrates a flowchart for managing attributes for an application server, according to various embodiments.

FIG. 4 illustrates a flowchart of overall processing that can be used to maintain attributes across one or more application servers, according to various aspects of the present teachings. In 402, processing can begin. In 404, a set of services can be registered with an application server. In embodiments, the set of services can be registered by a system administrator or other entity. In 406, a set of tokens can be generated for the set of services in response to registering the set of services. In embodiments, the set of tokens can be shared tokens that can be stored and/or maintained by other entities associated with the application server, such as a vault service, attribute management tools, and others, as described herein.

In 408, a request to configure a service of the set of services can be received, wherein the request comprises an associated token from the set of tokens. In embodiments, the request can be received from the service, the system administrator, or other entities. In 410, the associated token can be attempted to be validated. In embodiments, a vault service of the application server can attempt to validate the associated token. In 412, the processing can determine whether the associated token is validated. If the associated token is not validated, then processing can proceed to 414 in which an administrator can be notified of the unsuccessful validation.

In contrast, if the associated token is validated, then processing can proceed to 416 in which a set of attributes can be requested from an attribute management tool. In embodiments, the attribute management tool can be remote from the application server, and the set of attributes can be requested by the vault service. In 418, the set of attributes can be received from the attribute management tool. In embodiments, the attribute management tool can retrieve the set of attributes from an associated database. In 420, the service can be configured using the set of attributes. In embodiments, the set of attributes can be passwords and other sensitive data. In 422, processing can repeat, return to a prior processing point, jump to a further processing point, or end.

The foregoing description is illustrative, and variations in configuration and implementation may occur to persons skilled in the art. For example, while embodiments have been described in which the attribute management tool 220, and other entities, resides in a single server or platform, in embodiments the attribute management tool 220, and other entities and associated logic can be distributed among multiple servers, services, or systems. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    identifying an application server to execute a plurality of services;
    receiving a request to configure a service of the plurality of services, wherein the request comprises a token associated with the service;
    validating, by a processor, the token, wherein the validating comprises comparing the token to an additional token not maintained by the service;
    retrieving, by the processor, a plurality of attributes to the service in response to the validating the token; and
    configuring, by the processor, the service using the plurality of attributes.

2. The method of claim 1, wherein the request is received from the service.

3. The method of claim 1, wherein the request is received by an additional service of the application server, and wherein the additional service validates the token.

4. The method of claim 1, further comprising:
    sending an indication of the plurality of attributes in response to validating the token; and
    receiving the plurality of attributes in response to sending the indication.

5. The method of claim 4, wherein the indication is sent to a management tool remote from the application server, and wherein the plurality of attributes are received from the management tool.

6. The method of claim 1, further comprising:
    registering the plurality of services with the application server, wherein registering the plurality of services comprises generating a plurality of tokens for the plurality of services.

7. The method of claim 6, wherein a system administrator registers the plurality of services with the application server.

8. The method of claim 1, further comprising:
    notifying an administrator in response to a unsuccessful validation.

9. The method of claim 1, wherein the plurality of attributes comprises sensitive data.

10. A system comprising:
    a memory;
    a processor coupled to the memory to:
        identify an application server to execute a plurality of services;
        receive a request to configure a service of the plurality of services, wherein the request comprises a token associated with the service;
        validate the token, wherein the validate comprises compare the token to an additional token not maintained by the service; and
        retrieve a plurality of attributes to the service in response to the validate the token, and
        configure the service using the plurality of attributes.

11. The system of claim 10, wherein the request is received from the service.

12. The system of claim 10, wherein the request is received by an additional service of the application server, and wherein the additional service validates the token.

13. The system of claim 10, the processor to:
    send an indication of the plurality of attributes in response to validate the token; and
    receive the plurality of attributes in response to send the indication.

14. The system of claim 13, wherein the indication is sent to a management tool remote from the application server, and wherein the plurality of attributes are received from the management tool.

15. The system of claim 10, the processor to:
    register the plurality of services with the application server, wherein register the plurality of services comprises generate a plurality of tokens for the plurality of services.

16. The system of claim 15, wherein a system administrator registers the plurality of services with the application server.

17. The system of claim 10, the processor to:
    notify an administrator in response to a unsuccessful validation.

18. The system of claim 10, wherein the plurality of attributes comprises sensitive data.

19. The system of claim 15, the processor to distribute the plurality of tokens among the plurality of services.

20. The method of claim 6 further comprising distributing the plurality of tokens among the plurality of services.

* * * * *